(12) United States Patent
Schuermann et al.

(10) Patent No.: US 9,941,782 B2
(45) Date of Patent: Apr. 10, 2018

(54) POWER SUPPLY DEVICE AND METHOD FOR LIMITING AN OUTPUT CURRENT OF A POWER SUPPLY DEVICE

(71) Applicant: Weidmueller Interface GmbH & Co. KG, Detmold (DE)

(72) Inventors: Klaus Schuermann, Lage (DE); Michael Buschkamp, Lage (DE)

(73) Assignee: Weidmueller Interface GMBH & Co., KG (DE)

( * ) Notice: Subject to any disclaimer, the term of this patent is extended or adjusted under 35 U.S.C. 154(b) by 0 days.

(21) Appl. No.: 15/033,041

(22) PCT Filed: Nov. 18, 2014

(86) PCT No.: PCT/EP2014/074839
§ 371 (c)(1),
(2) Date: May 23, 2016

(87) PCT Pub. No.: WO2015/082207
PCT Pub. Date: Jun. 11, 2015

(65) Prior Publication Data
US 2016/0285356 A1    Sep. 29, 2016

(30) Foreign Application Priority Data

Dec. 6, 2013 (DE) .......................... 10 2013 113 648

(51) Int. Cl.
*H02M 1/32* (2007.01)
*H02M 3/335* (2006.01)
*H02H 9/02* (2006.01)

(52) U.S. Cl.
CPC ......... *H02M 1/32* (2013.01); *H02M 3/33507* (2013.01); *H02H 9/02* (2013.01)

(58) Field of Classification Search
CPC ....... H02M 1/32; H02M 3/33507; H02H 9/02
See application file for complete search history.

(56) References Cited

U.S. PATENT DOCUMENTS

| | | | | | |
|---|---|---|---|---|---|
| 4,646,219 | A | * | 2/1987 | Rohl | ................ H02M 3/33523 361/18 |
| 6,150,739 | A | * | 11/2000 | Baumgartl | ............. H02H 1/066 307/130 |

(Continued)

FOREIGN PATENT DOCUMENTS

| DE | 197 40 932 A1 | 4/1999 |
|---|---|---|
| DE | 199 62 615 A1 | 7/2001 |

(Continued)

OTHER PUBLICATIONS

Machine English Translation of EP 1148626 A2, Oct. 2001.*

(Continued)

*Primary Examiner* — Timothy J Dole
*Assistant Examiner* — Sisay G Tiku
(74) *Attorney, Agent, or Firm* — Laubscher, Spendlove & Laubscher, P.C.

(57) ABSTRACT

A switched-mode power supply system and method for converting an input voltage into an output voltage, including at least one switching stage controlled by a pulse-width modulation circuit in a clocked manner, and a control circuit that influences a pulse-width modulation circuit to vary the level of the output voltage, characterized by the provision of a current limiting circuit which, after a threshold voltage has been exceeded, limits the power supply output current first to an elevated maximum current for a first period of time, and thereafter to a regular maximum current. The control circuit is such that the first period of time for which the output current is limited to the elevated maximum current is dependent on the level of the output current.

10 Claims, 3 Drawing Sheets

(56) References Cited

U.S. PATENT DOCUMENTS

| | | | | |
|---|---|---|---|---|
| 2005/0002134 A1* | 1/2005 | Ohtake | ............... | H02M 3/156 361/18 |
| 2005/0052168 A1* | 3/2005 | Tazawa | ............... | H02M 3/1584 323/282 |
| 2005/0094422 A1* | 5/2005 | Hoffmann | ........... | H02M 3/1584 363/65 |
| 2007/0008664 A1* | 1/2007 | Zeuch | .................. | H02H 3/025 361/18 |
| 2008/0024095 A1* | 1/2008 | Lampinen | ......... | H02M 3/33507 323/247 |
| 2009/0219738 A1* | 9/2009 | Kort | ................... | H02M 1/4225 363/126 |
| 2011/0194871 A1* | 8/2011 | Matsumoto | ........ | G03G 15/5004 399/88 |
| 2016/0064998 A1* | 3/2016 | Maeda | ................... | H02J 7/022 307/64 |

FOREIGN PATENT DOCUMENTS

| | | | |
|---|---|---|---|
| DE | 601 19 474 T2 | 12/2006 | |
| DE | 102005031833 A1 | 1/2007 | |
| EP | 1148626 A2 * | 10/2001 | ........ H02M 3/33523 |

OTHER PUBLICATIONS

Infineon Technologies, ICs for Consumer Electronics, Controller for Switch Mode Power Supplies Supporting Low Power Standby and Power Factor Correction, TDA 16846/TDA 16847, Data Sheet Jan. 14, 2000.

* cited by examiner

POWER SUPPLY DEVICE AND METHOD FOR LIMITING AN OUTPUT CURRENT OF A POWER SUPPLY DEVICE

REFERENCE TO RELATED APPLICATIONS

This application is a national stage application under 35 C.F.R. § 371 of the PCT International Application No. PCT/EP2014/074839 filed Nov. 18, 2014, which claims priority of the German application No. DE 10 2013 113 648.6 filed Dec. 6, 2013.

BACKGROUND OF THE INVENTION

Field of the Invention

A switched-mode power supply system and method for converting an input voltage into an output voltage, including at least one switching stage controlled by a pulse-width modulation circuit in a clocked manner, and a control circuit that influences a pulse-width modulation circuit to vary the level of the output voltage. A current limiting circuit is provided which, after a threshold voltage has been exceeded, limits the power supply output current first to an elevated maximum current for a first period of time, and thereafter to a regular maximum current. The length of the first period of time is dependent on the level of the output current.

Description of Related Art

It is known in the prior art to provide power supply systems in which an input voltage is converted by means of a switching stage into an alternating current voltage the frequency of which usually lies in the kilohertz range. This input side higher frequency alternating-current voltage is transformed, by means of a transformer into an output-side higher frequency alternating—current voltage which is lower or higher, and is then rectified again. The power supply system in this case can be embodied as a direct current converter, also called a DC/DC converter, in which a direct-current voltage as input voltage is converted into a direct—current voltage as output voltage. The power supply system can also be embodied as a so-called switched-mode power supply device, in which a mains alternating current voltage as input voltage is rectified and then converted to an output direct current voltage.

To stabilize the output direct-current voltage supplied by the power supply system, a control circuit is provided which controls the output voltage to the most constant value possible, independently of a connected load. This can be accomplished by changing the frequency and/or the pulse width or duty factor of the clocked actuation of the switching stage in a pulse-width modulation method (PWM). For this purpose, the power supply system has a PWM switching stage, which is influenced by the control circuit.

In addition to maintaining the most constant output voltage possible, the control circuit also typically performs current limitation, in which the supplied output current is limited to a preset value by adjusting the output voltage downwardly once the current value is reached, so that the preset maximum current value will not be exceeded.

Particularly in the case of power supply devices that supply high currents in the range of several to several tens of amperes to power systems, such systems are provided with an overcurrent protector, for example a safety fuse or e.g. a thermal and/or magnetic overcurrent protective device, or a combination of such protective elements. The overcurrent protective device prevents components and/or leads from overheating, particularly in the event of a fault. However, safety fuses and the aforementioned thermal or magnetic overcurrent protective devices are very slow-acting and also require tripping currents, which can amount to many times the nominal current for which the protector is designed. Power supply units that have a transformer which operates directly at the power supply unit and at the unit frequency are usually capable of supplying a sufficiently high output current, many times greater than the nominal current, at least for a sufficient period of time to ensure a reliable tripping of the protector.

With the power supply systems of the type described above, however, the current limitation for protecting against thermal overloading of the switched-mode power supply device is typically set to approximately 1.1 to 1.5 times the nominal output current. Moreover, the current limitation of the switched-mode power supply device operates so quickly that without additional measures, the protective elements connected downstream will be tripped too late or unreliably.

To ensure the reliable tripping of a safety fuse connected downstream or a thermal or magnetic overcurrent protective device connected downstream, for example, even in the case of a clocked power supply system, German patent No. DE 10 2005 031 833 A1 discloses a power supply system in which a very high output current, which is five to ten times the nominal current, for example, can be supplied for a predetermined amount of time, and after the predetermined time has elapsed the current limitation is returned to a lower value of 1.1 to 1.5 times the nominal current, for example. The higher maximum current is available during the predetermined time for the reliable tripping of a safety fuse connected downstream or an overcurrent protective device connected downstream. Once the predetermined time has elapsed, only the maximum current that is slightly higher than the nominal current is steadily supplied. Adjusting downwardly to the slightly elevated maximum current prevents a thermal overload of the power supply system, in case a protective device is not provided downstream or has not been tripped. The latter can occur particularly when, in the event of a fault, although the flowing current is elevated, it is not high enough that the predetermined time is sufficient to trip the protective device. This leads to an undesirable operating state in which the elevated current continues to be supplied to the system.

The present invention was developed to provide a power supply system having a clocked switching stage, in which an overcurrent protective device connected downstream will be tripped even in cases of an overcurrent in which the external overcurrent protective device is not tripped within the predetermined time.

SUMMARY OF THE INVENTION

Accordingly, a primary object of the present invention is to provide a switched-mode power supply system and method for converting an input voltage into an output voltage, including at least one switching stage controlled by a pulse-width modulation circuit in a clocked manner, and a control circuit that influences a pulse-width modulation circuit to vary the level of the output voltage. A current limiting circuit is provided which, after a threshold voltage has been exceeded, limits the power supply output current first to an elevated maximum current for a first period of time, and thereafter to a regular maximum current, the first period of time being dependent on the level of the output current.

According to another object the control circuit is configured such that the period of time during which the output current is limited to the elevated maximum current is dependent on the level of the output current. The elevated maximum current that flows to trip an overcurrent protective device connected downstream is therefore not available for a predetermined—and thus possibly too short—period of time, but rather, is available, depending on the situation, for a period of time the duration of which is dependent on the level of current that is flowing in the specific overcurrent case. The elevated maximum current is preferably between 5 and 10 times the nominal current of the power supply device and the regular maximum current is approximately between 1.1 times and 1.5 times the nominal current.

According to a further object of the invention, in an advantageous embodiment of the power supply system, the longer the period of time, the smaller is the difference between the output current and the threshold value that defines the overcurrent case during the stated period of time. For example, the threshold value can be set to the value of the regular maximum current. In this embodiment, an output current that is not as high is able to flow for a longer time in the case of a fault, until the power supply device adjusts downward from the elevated maximum current to the regular maximum current. The resulting time characteristic of the maximum current benefits the tripping of a safety fuse or a thermal or magnetic overcurrent protective device, connected downstream of the power supply device. In the case of a very high current, corresponding to 10 times the nominal current of the protective device, for example, a shorter time is required for tripping the protective device than with a lower current, corresponding to only 5 times the nominal current of the protective device, for example. Since the thermal load of the power supply device is lower with a lower maximum current than with a higher maximum current, the power supply device is able to offer this time characteristic without the risk of a thermal overload of the power supply device while the elevated maximum current is being supplied.

The time characteristic of the current limiting circuit also enables loads to be powered with a high starting current, as is typically the case with engine loads or capacitive loads. An engine starting current of around 2.5 times the nominal current of the power supply device, for example, can then be supplied for a correspondingly longer time as compared with a short-circuit with an overcurrent of 10 times the level of the nominal current, for example.

The power supply device can also be a DC/DC converter, or an AC/DC converter, e.g. a switched-mode power supply device. The latter can be embodied for connection to single-phase or multi-phase networks, e.g. 3-phase networks. The input voltages may range from 10 to 800 volts (V); nominal currents may range from several amperes to several tens of amperes (A). The elevated maximum current may be supplied by means of an energy store, for example a capacitor. However, in terms of current-carrying capacity, the power supply device may also be embodied such that the capacity for supplying output current is provided directly at the input of the power supply device.

In an advantageous embodiment of the power supply device, said device has a first comparison stage, which compares a voltage that is proportional to the output current with a first reference value, the first reference value corresponding to the level of the present maximum current. The current is thereby limited to a maximum current. The power supply device further preferably has an integrator circuit, via which the voltage, which is proportional to the output current, is supplied filtered to a second comparison stage, which compares the filtered voltage with a second reference value that corresponds to the regular maximum current, wherein an output of the second comparison stage is coupled to the first comparison stage in such a way that it influences the level of the first reference value. The set maximum current is therefore lowered from the elevated to the regular maximum value once an integration element of the integrator circuit has been "charged". The integration results in a dynamic adjustment of the period of time during which the elevated maximum current is supplied, based on the level of current flowing in the case of a fault.

The integrator circuit preferably has a capacitor as an integration element and at least one charging and/or discharging resistor in a low-pass assembly. In this case, a charging resistor having a series-connected diode and a discharging resistor having an additional series-connected diode may be provided, the two series circuits being connected antiparallel to one another with respect to the diode or the additional diode. The time characteristic of current limitation is adjusted by means of the charging and/or discharging resistor. A common charging and discharging resistor may be used for this purpose, or alternatively separate charging resistors and discharging resistors, with the direction of current in the resistor and therefore its function (charging/discharging) being determined in each case by a series connection with the diode or the additional diode.

When, either by a tripping of the protective device connected downstream or by a correction of the fault, the output current at the output of the power supply device drops back below the regular maximum current, the capacitor will be discharged via the discharging resistor. Only after the capacitor has been discharged to below the second reference value is the elevated maximum current again available for the next fault. The time constant for the discharge can be selected by selecting the discharging resistor such that an elevated maximum current can be supplied a second time by the power supply device only after the power supply device has cooled again sufficiently. The time constant for discharging the capacitor is therefore preferably adjusted to typical time constants for cooling the power supply device. In a further preferred embodiment, a temperature-dependent resistor, in particular a PTC (positive temperature coefficient) resistor, is additionally arranged in the series circuit of the discharging resistor and the additional diode. The time constant for discharging the capacitor is thereby embodied as temperature dependent. When the temperature of the power supply device or the component to which the temperature-dependent resistor is thermally contacted is higher, the time constant for discharging the capacitor is lengthened, and therefore the regeneration time during which no elevated maximum current is supplied is lengthened when the temperature of the power supply device is elevated.

A method for limiting an output current of a power supply device, according to the invention, comprises the following steps: a current limitation for the output current is set to an elevated maximum current. When an output current that is above the threshold value is detected, the output current that lies above the threshold value but below the level of the elevated maximum current is supplied for a period of time, the length of which is dependent on the level of the detected output current. The current limitation of the output current is then adjusted to a regular maximum current that is lower than the elevated maximum current. This method can be carried out particularly in the above-described power supply device. The advantages described in connection with the power supply device according to the invention result.

In an advantageous embodiment of the method, after a further period of time, the current limitation is returned to the elevated maximum current. The duration of this additional period of time can preferably be dependent on the level of the detected output current during the time in which the current limitation is set to the regular maximum current. More preferably, the duration of the additional period of time can be dependent on a temperature measured in the power supply device.

In an advantageous embodiment of the method, the duration of the period of time and optionally of the additional period of time is determined by an integration of a voltage that represents the output current. The integration results in a simple manner in a suitable time characteristic for the dependence of the duration of the time period or of the additional time period on the level of current that is flowing. A current that does not remain constant for the duration of the time period is also taken into consideration. The integration over the current essentially also describes the thermal load to which the power supply device is exposed during the period of overcurrent. The duration of the time period during which a current that is above the regular maximum current can be supplied can therefore be adjusted to the set temperature of the power supply device or the temperature-critical components thereof during this time period.

BRIEF DESCRIPTION OF THE DRAWINGS

Other objects and advantages of the invention will become apparent from a study of the following specification, when viewed in the light of the accompanying drawing, in which.

DETAILED DESCRIPTION OF THE INVENTION

Figure 1:
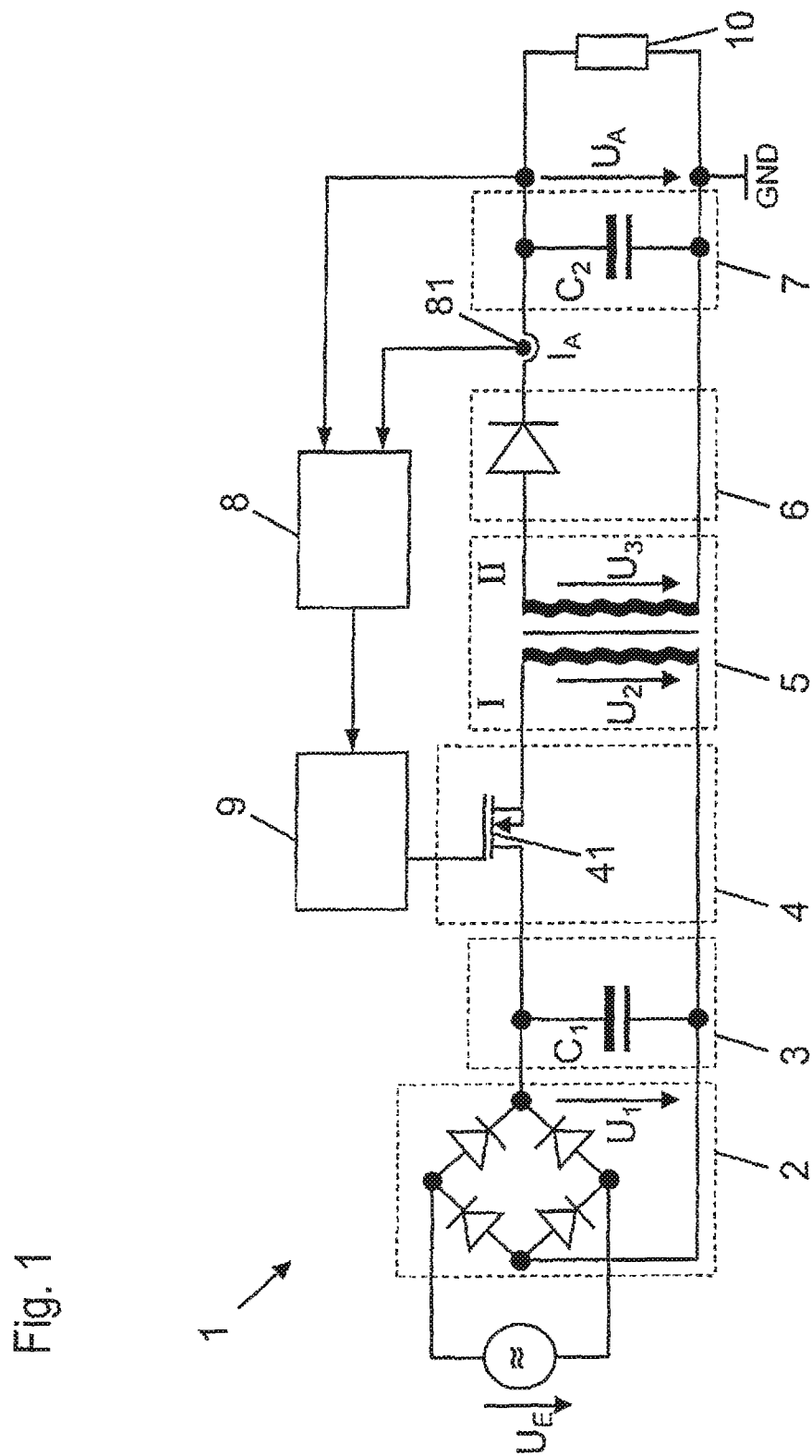
FIG. 1 is a schematic circuit diagram of the switched-mode power supply system of the present invention.

Referring first more particularly to FIG. 1, a switched-mode power supply system 1 is provided for converting an input voltage $U_E$, in this case an input alternating-current voltage, into an output voltage $U_A$, in this case an output direct-current voltage.

Input voltage $U_E$ is converted by means of a rectifier 2 into a pulsing direct current voltage $U_1$, which is smoothed and/or filtered by means of a smoothing circuit 3. For this purpose, the smoothing circuit 3 has a first smoothing capacitor $C_1$. Alternatively, an active power factor correction circuit (PFC=power factor correction) may also be used as rectifier 2.

Direct current $U_1$ is fed in a clocked manner to a primary-side (I) winding of a transformer 5, via a switching stage 4 having a switching element 41. Switching stage 4 converts direct-current voltage $U_1$ into a higher frequency alternating-current voltage $U_2$, the frequency of which is significantly higher than the frequency of input alternating current voltage $U_E$.

Alternating current voltage $U_2$ is converted by transformer 5 into a smaller (or in certain applications also greater) amount of secondary-side (II), higher frequency alternating current voltage $U_3$. The secondary-side, higher frequency alternating current voltage $U_3$ is then rectified again in a secondary-side rectifier 6 into a secondary-side direct current voltage and is smoothed and/or filtered in a secondary-side smoothing circuit 7. For this purpose, the secondary-side smoothing assembly 7 in this case has an additional smoothing capacitor $C_2$, by way of example. In principle, however, more complex circuits comprising a plurality of particularly discrete components (not shown) for the secondary-side smoothing assembly 7 are preferred.

The output voltage of secondary-side smoothing circuit 7 is output voltage $U_A$ of power supply device 1, which in this case is positive relative to a reference potential GND.

In order for output voltage $U_A$ to remain stable even with a changing load 10, a control circuit 8 is provided, which compares output voltage $U_A$ with a reference voltage and, based on this comparison, influences a pulse-width modulation (PWM) circuit 9. PWM circuit 9 controls switching stage 4 and modifies the clock parameters, in particular a timing ratio, but optionally also a timing frequency, of switching stage 4, based on the data from control circuit 8, thereby influencing output voltage $U_A$. Thus a control circuit is formed by which output voltage $U_A$ is held at a desired, predetermined value.

In addition to this voltage control, a current control is also provided, in which process a current $I_A$ flowing at the output of switched-mode power supply device 1 and delivered to load 10 is measured by a current sensor 81, and the control circuit is configured to limit current $I_A$ by lowering voltage $U_A$ to a specifiable maximum current. Current sensor 81 can be arranged as shown here, upstream of smoothing assembly 7 or between said assembly and load 10, without any significant impact on the method of functioning. Details of the current limitation by means of control circuit 8 will be described below in reference to FIGS. 2 and 3.

A switched-mode power supply device 1 of this type frequently also has a filter (not shown), which is used for filtering input alternating current voltage $U_E$ prior to rectification, in order to filter out harmonics, overvoltages and/or mains-borne interferences.

On the secondary side, transformer 5 may also have a plurality of secondary windings (not shown), which may be used to generate secondary-side alternating current voltages $U_3$ of various levels. In this embodiment of switched-mode power supply device 1, a plurality of rectifiers 6 and smoothing assemblies 7 would then be provided for each of the different secondary-side alternating current voltages.

Figure 2:
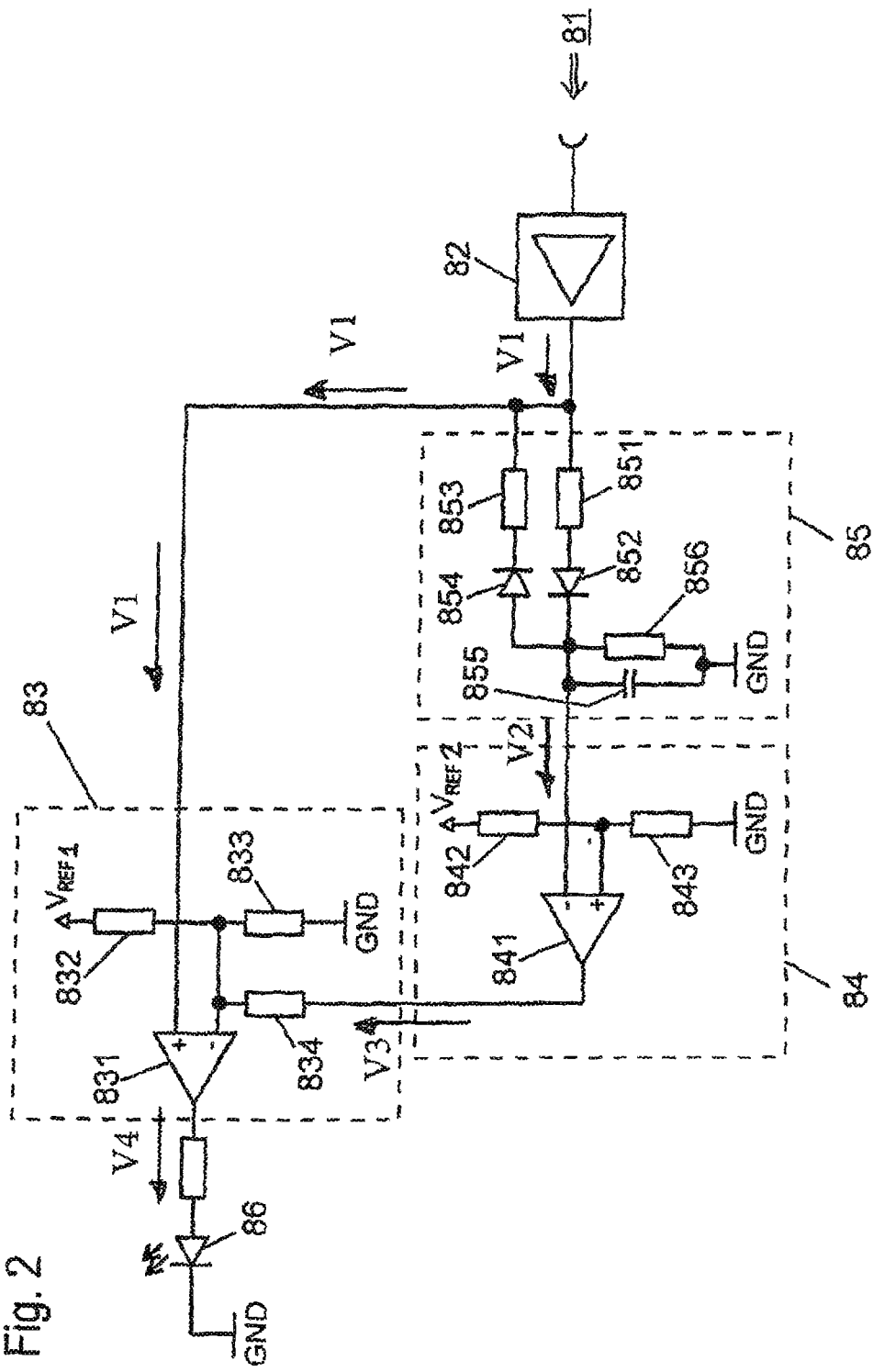
FIG. 2 is a detailed circuit diagram of a first embodiment of the control circuit of FIG. 1.

FIG. 2 shows a portion of control circuit 8 of switched-mode power supply device 1 in greater detail. Illustrated here is the circuit for current limitation within control circuit 8. The circuit for voltage control in a switched-mode power supply device of this type is known in principle and therefore will not be described in greater detail in this application.

Control circuit 8 has an evaluation amplifier 82 for the signal of current sensor 81. Evaluation amplifier 82 is connected to current sensor 81 and has an output, where a voltage $V_1$ that is proportional to measured current $I_A$ is output. A shunt resistor may act as current sensor 81, in which case the voltage drop at the shunt resistor is a measure of flowing current $I_A$. Alternatively, a Hall sensor may be used for current measurement.

The voltage signal $V_1$ emitted by evaluation amplifier 82 is fed to a first comparison stage 83, which has an operational amplifier 831 as comparator. The signal $V_1$ which is proportional to output current $I_A$ is fed to the non-inverting input of operational amplifier 831, whereas a first comparison voltage, which in the present case is generated from a first reference voltage $V_{ref1}$ and a voltage divider, is fed to the inverting input. For this purpose, the inverting input of operational amplifier 831 is connected via a resistor 832 to the first reference voltage source ($V_{ref1}$), and is also connected via a further resistor 833 to reference potential GND.

In addition, the inverting input of operational amplifier 831 is further connected via an additional resistor 834 to an output of a second comparison stage 84. Initially, it is assumed that the output $V_3$ of the second comparison stage 84 is at a positive reference potential relative to reference potential GND. In this case, the potential at the inverting input of operational amplifier 831 results from first reference voltage $V_{ref1}$ via resistor 832 or from the stated positive potential and the additional resistor 834 on one hand, and the additional resistors 833 on the other. The resistance values or potentials are selected in this case such that, at the output of operational amplifier 831—and therefore of first comparison stage 83—a positive potential $V_4$ is established when output current $I_A$ of switched-mode power supply device 1 is greater than or equal to a specified elevated maximum current $I'_{max}$. The elevated maximum current $I'_{max}$ is selected in this case as a high current in the range of five to ten times the output nominal current $I_{nenn}$ of switched-mode power supply device 1.

When a positive potential is present at the output $V_4$ of first operational amplifier 831, a light-emitting diode of an optocoupler 86 is switched on via a voltage drop resistor, not shown in greater detail in the figure, wherein optocoupler 86 influences the voltage control branch of control circuit 8, not shown here, causing a decrease in output voltage $U_A$. Switched-mode power supply system 1 is thereby limited by first control circuit 83, via optocoupler 86, to elevated maximum current $I'_{max}$.

Second comparison stage 84 likewise has an operational amplifier 841 as comparator, to which a second reference value is fed at a non-inverting input. This second reference value is formed in relation to reference potential GND from second reference voltage $V_{ref2}$ by means of a voltage divider comprising resistors 842 and 843. The value that will be compared with this reference value is fed to the inverting input of operational amplifier 841.

Second comparison stage 84 supplies at its output the abovementioned positive voltage value $V_3$ when the input voltage $V_2$ of second comparison stage 84 is below the second reference value $V_{ref2}$. If the voltage $V_2$ at the input of second comparison stage 84 exceeds the second reference value $V_{ref2}$, a negative potential or, depending on the supply voltage of operational amplifier 841, reference potential GND, will be output at the output of second comparison stage 84. Thus, the first reference value present at the inverting input of operational amplifier 831 of first comparison stage 83, via resistor 834, is dependent upon the potential $V_3$ at the output of second comparison stage 84.

More specifically, when the second reference value $V_{ref2}$ is exceeded at the input $V_2$ of second comparison stage 84, the current limitation is decreased from the specified elevated maximum current $I'_{max}$ to a regular maximum current $I_{max}$. Thus the interconnection of the two comparison stages 83, 84 results in a limitation of output current $I_A$ either to elevated maximum current $I'_{max}$ or to regular maximum current $I_{max}$. Regular maximum current $I_{max}$ can be determined by the selection of the resistance values of resistors 832, 833 and 834 and by the potentials $V_3$ present at the output of operational amplifier 841 of second comparison stage 84. Regular maximum current $I_{max}$ is advantageously set to a value within the range of 1.1 to approximately 1.5 times the output nominal value $I_{nom}$ of switched-mode power supply device 1.

The switchover between the two maximum currents $I'_{max}$, $I_{max}$ is implemented by means of an integrator circuit 85, which is connected upstream of the input of second comparison stage 84. On the input side, integrator circuit 85 is connected to the output of evaluation amplifier 82, and is thus supplied the voltage $V_1$ that is proportional to output current $I_A$ in the same manner as the input of first comparison stage 83.

Integrator circuit 85 has a charging resistor 851 which is connected to the input, and which is connected via a diode 852 to a capacitor 855 that is connected to reference potential GND. Parallel to charging resistor 851 and diode 852, a branch having a series circuit comprising a discharging resistor 853 and an additional diode 854 is connected. The additional diode 854 is arranged in the opposite direction from diode 852. Integrator circuit 85 is thus configured as a low-pass circuit, however capacitor 855, and therefore the output of integrator circuit 85, is charged to a potential which is positive in relation to reference potential GND via charging resistor 851, and capacitor 855 is discharged via discharging resistor 853. By properly selecting the resistance values for resistors 851 and 853, different time constants for the charging and discharging of capacitor 855 may be selected. In principle, a circuit comprising only one common charging and discharging resistor is also conceivable, which would result in equal time constants for the charging and discharging of the resistor. In addition, parallel to capacitor 855 an additional discharging resistor 856 is arranged, which has a high resistance value relative to charging resistor 851 and discharging resistor 853, and which serves substantially to discharge capacitor 855 even when switched-mode power supply device 1 is switched off.

During operation of switched-mode power supply device 1, the output $V_2$ of integrator circuit 85 substantially follows the voltage $V_1$ supplied at the output of evaluation amplifier 82 and reflects output current $I_A$. In the event of a fault, for example a short-circuit at the output of switched-mode power supply device 1, output current $I_A$ will increase from a value below output nominal current $I_{nom}$ to a maximum of the elevated maximum value $I'_{max}$, which is adjusted at first comparison stage 83, since the voltage $V_3$ at the output of integrator circuit 85 is at first lower than the second reference voltage $V_{ref2}$.

This voltage $V_2$ at the output of integrator circuit 85 follows the voltage jump at the output of evaluation amplifier 82 only slowly, namely with the time constant determined by the resistance value of charging resistor 851 and the capacitance of capacitor 855. As long as the output $V_2$ of integrator circuit 85 remains below the second reference value, the current limitation will remain at elevated maximum value $I'_{max}$. Once it exceeds the second reference value, the current limitation is lowered to regular maximum current $I_{max}$. The switched-mode power supply device then optionally remains steadily in this state.

In the event of a fault, if output current $I_A$ increases to a current value that is above regular maximum current $I_{max}$ but does not reach elevated maximum current $I'_{max}$, it will take correspondingly longer before the voltage $V_2$ at the output of integrator circuit 85 exceeds the second reference value. Therefore, in the event of a fault, an output current $I_A$ that is not as high can continue to flow for a longer time before switched-mode power supply device 1 is adjusted downward from elevated maximum current $I'_{max}$ to regular maximum current $I_{max}$. This results in a time dependence of the maximum supplied output current, which is dependent on output current level $I_A$.

This characteristic has an advantageous effect on the tripping of a safety fuse or of a thermal or magnetic overcurrent protective device, connected downstream of switched-mode power supply device 1. In the case of a very high current, corresponding to 10 times the nominal current of the protective device, for example, less time is required for tripping the protective device than with a lower current that is only 5 times the nominal current of the protective device, for example. Since the thermal load is lower with a lower maximum current for switched-mode power supply system 1 than with a higher maximum current, switched-mode power supply device 1 is able to supply this time characteristic without risk of a thermal overload of switched-mode power supply device 1 while the elevated maximum current is being supplied.

The time characteristic of the current limiting circuit also enables the powering of loads with a high starting current, as is typically the case with engine loads or capacitive loads. An engine starting current of around 2.5 times the nominal current of the power supply device, for example, can then be supplied for a correspondingly longer time as compared with a short-circuit with an overcurrent of 10 times the level of the nominal current.

When output current $I_A$ at the output of switched-mode power supply device 1 drops back below regular maximum current $I_{max}$, either due to a tripping of the protective device downstream or by a correction of the fault, capacitor 855 is discharged via additional diode 854 and discharging resistor 853. When capacitor 855 is discharged below the second reference value, the next time a fault occurs the elevated maximum current $I'_{max}$ will again be initially available. The time constant for discharge can be selected by selecting resistor 853 such that switched-mode power supply device 1 is able to supply an increased maximum current again only after switched-mode power supply device 1 has cooled sufficiently. The time constant for discharging capacitor 855 is therefore preferably adapted to typical time constants for cooling switched-mode power supply device 1.

Figure 3:
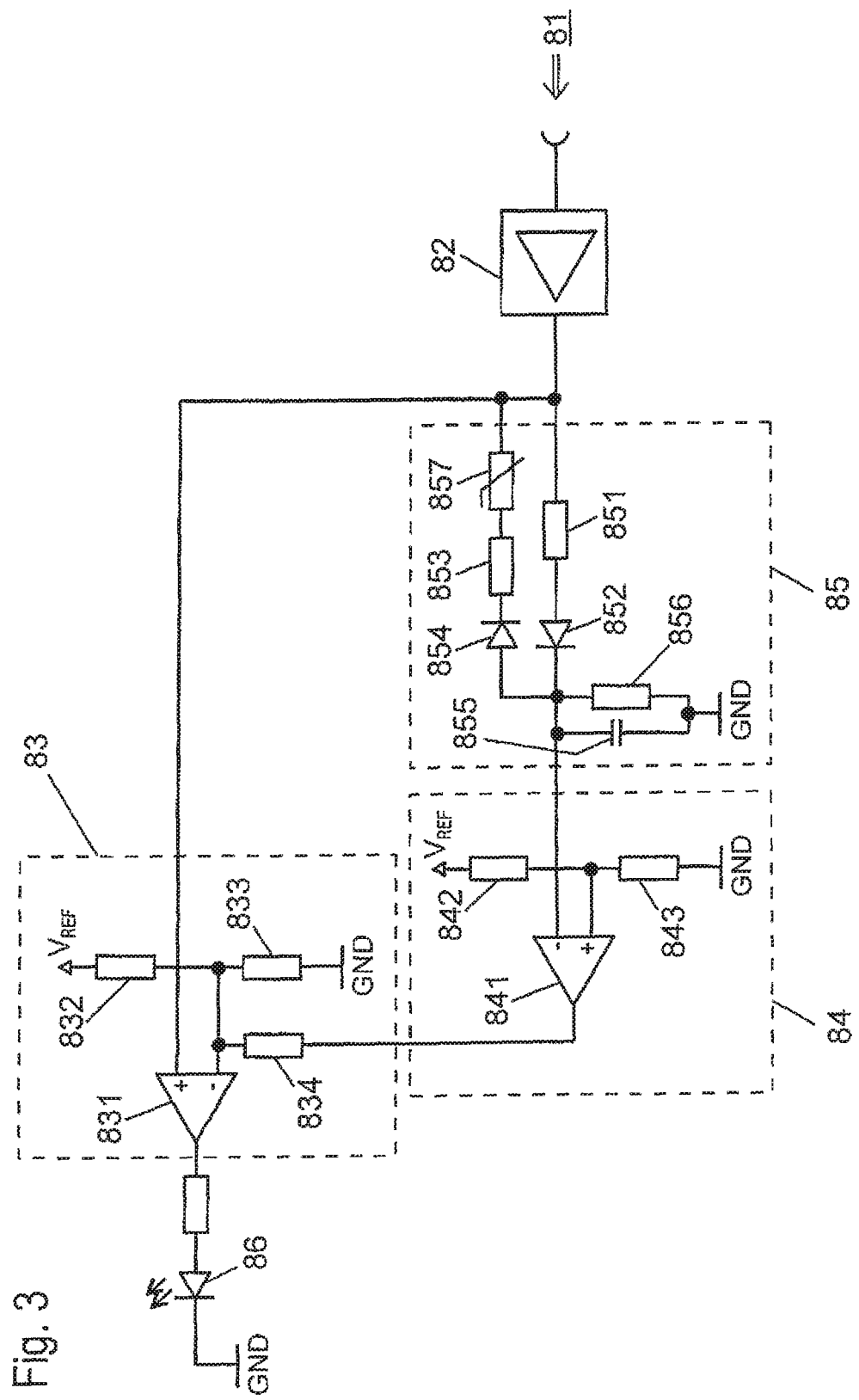
FIG. 3 is a detailed circuit diagram of a modification of the control circuit of FIG. 2.

In the same manner as FIG. 2, FIG. 3 shows a further embodiment example of a portion of control circuit 8 of a switched-mode power supply device 1 according to the invention. Similar or similarly functioning elements are identified in this embodiment example by the same reference signs. In terms of its basic structure, the circuit shown in FIG. 2 corresponds to the circuit shown in FIG. 2, the description of which is provided herewith.

In contrast to the embodiment example of FIG. 2, an additional discharging resistor 857 is provided in the discharge branch of integrator circuit 85, within the series circuit of additional diode 854 and discharging resistor 853, said additional discharging resistor having a temperature-dependent resistance value, and being particularly formed by a PTC (positive temperature coefficient) resistor. The additional discharging resistor 857 changes its resistance value based on the temperature of switched-mode power supply device 1, in particular based on the temperature of a component, the temperature of which changes dramatically dependent on the load, for example the temperature of the output-side rectifier stage 6. The time constant for discharging the capacitor 855 is therefore temperature dependent. When the temperature of switched-mode power supply device 1 or the component with which the additional discharging resistor 857 is in thermal contact is higher, the time constant for discharging the capacitor 855 is lengthened. Therefore, when switched-mode power supply device 1 is at an elevated temperature, the regeneration time available to switched-mode power supply device 1, during which switched-mode power supply device 1 cannot supply an elevated maximum current $I'_{max}$, is lengthened.

While in accordance with the provisions of the Patent Statutes the preferred forms and embodiments of the invention have been illustrated and described, it will be apparent to those skilled in the art that changes may be made without deviating from the invention described above.

What is claimed is:

1. A switched-mode power supply for converting an input voltage to an output voltage, comprising:
   (a) a transformer having primary and secondary windings:
   (b) at least one switching stage circuit which supplies said input voltage to said transformer primary winding; thereby causing said secondary winding to produce an output current and an output voltage, said switching stage circuit including a switching element:
   (c) a pulse-width modulation circuit connected with said switching stage switching element to control in a clocked manner the operation of said switching stage circuit: and
   (d) a control circuit which controls the operation of said pulse-width modulation circuit to vary the level of the output voltage, said control circuit including a current limiting circuit for establishing a current threshold level and operable when said current threshold level has been exceeded by a voltage signal that is a function of the output current to limit for a first period of time the output current to an elevated maximum current, and thereafter to limit the output current to a regular maximum current, said first period of time being dependent on the level of said output current, said current limiting circuit including
   (1) a first comparison circuit for comparing a first voltage signal with a first reference voltage, thereby to produce an output voltage signal that controls the operation of said pulse-width modulation circuit, and thereby control the level of said output voltage;
   (2) an integrator circuit for filtering said first voltage signal to produce a second voltage signal; and
   (3) a second comparison circuit for comparing said second voltage signal with a second reference voltage corresponding with said regular maximum current, thereby to produce a third voltage signal that is supplied as an input to said first comparison circuit to influence the operation of said first comparison circuit.

2. A switched-mode power supply as defined in claim 1, wherein the longer said first period of time exists, the smaller is the difference between said first voltage signal and said first threshold value during said first period of time.

3. A switched-mode power supply as defined in claim 1, wherein said integrator circuit comprises a low-pass filter including at least one charging/discharging resistor and a capacitor.

4. A switched-mode power supply as defined in claim 1, wherein said integrator circuit includes a first branch including a charging resistor connected in series with a first diode having a first polarity, and a second branch connected in parallel with said first branch, said second branch including a discharging resistor connected in series with a second diode of the opposite polarity.

5. A switched-mode power supply arrangement as defined in claim 4, and further including a temperature-dependent resistor connected in series in said second branch.

6. A switched-mode power supply as defined in claim 1, wherein said input voltage has a range of from between about 10 volts to about 800 volts.

7. A switched-mode power supply as defined in claim 1, wherein said input voltage has a range of from about 15 volts to about 265 volts.

8. A switched-node power supply as defined in claim 1, wherein said input, voltage is an alternating-current voltage, and said output voltage is a direct-current voltage.

9. A switched-mode power supply as defined in claim 1, wherein said output current normally has a nominal current value, and further wherein said elevated maximum current is between 5 to 10 times said nominal current value, and said regular maximum current is between 1.1 and 1.5 times said nominal current.

10. A switched-mode power supply for converting an input voltage to an output voltage, comprising:
 (a) a transformer having primary and secondary windings;
 (b) at least one switching stage circuit for supplying said input voltage to said transformer primary winding, thereby causing said transformer secondary winding to produce an output current and an output voltage, said switching stage circuit containing a switching element;
 (c) a pulse-width modulation circuit connected with said switching stage switching element for controlling in a clocked manner the operation of said switching stage circuit; and
 (d) a control circuit controlling the operation of said pulse-width modulation circuit to vary the level of the output voltage, said control circuit including:
  (1) a first comparison stage including:
   (a) a first operational amplifier having an output terminal connected with said pulse-width modulation circuit, and a pair of input terminals; and
   (b) a first reference voltage connected with a first one of said first operational amplifier input terminals;
  (2) a sensor which applies a first voltage signal that is a function of the output current to a second input terminal of said first operational amplifier, whereby upon the occurrence of an overload, an elevated maximum current is permitted;
  (3) an integrator circuit for generating from said first voltage signal a time-integrated second voltage signal;
  (4) a second comparison stage including:
   (a) a second operational amplifier having an output terminal connected with said first operational amplifier first input terminal, and a pair of input terminals; and
   (b) a second reference voltage connected with a first input terminal of said second operational amplifier, the second input of said second operational amplifier being connected with said integrator circuit to receive said time-integrated second voltage signal, thereby to produce a third voltage signal at the output terminal of said second operational amplifier that influences the operation of said first operational amplifier;
  (5) said control circuit being operable when the threshold level established by said second reference voltage has been exceeded to limit for a first period of time the output current at the elevated maximum current, and thereafter to limit the output current to a regular maximum current, said first period of time being dependent on the level of said output current.

* * * * *